J. G. P. THOMAS.
POWER TRANSMISSION ON RAIL AND ROAD TRAINS AND THE LIKE.
APPLICATION FILED DEC. 12, 1916.
1,301,768.
Patented Apr. 22, 1919.
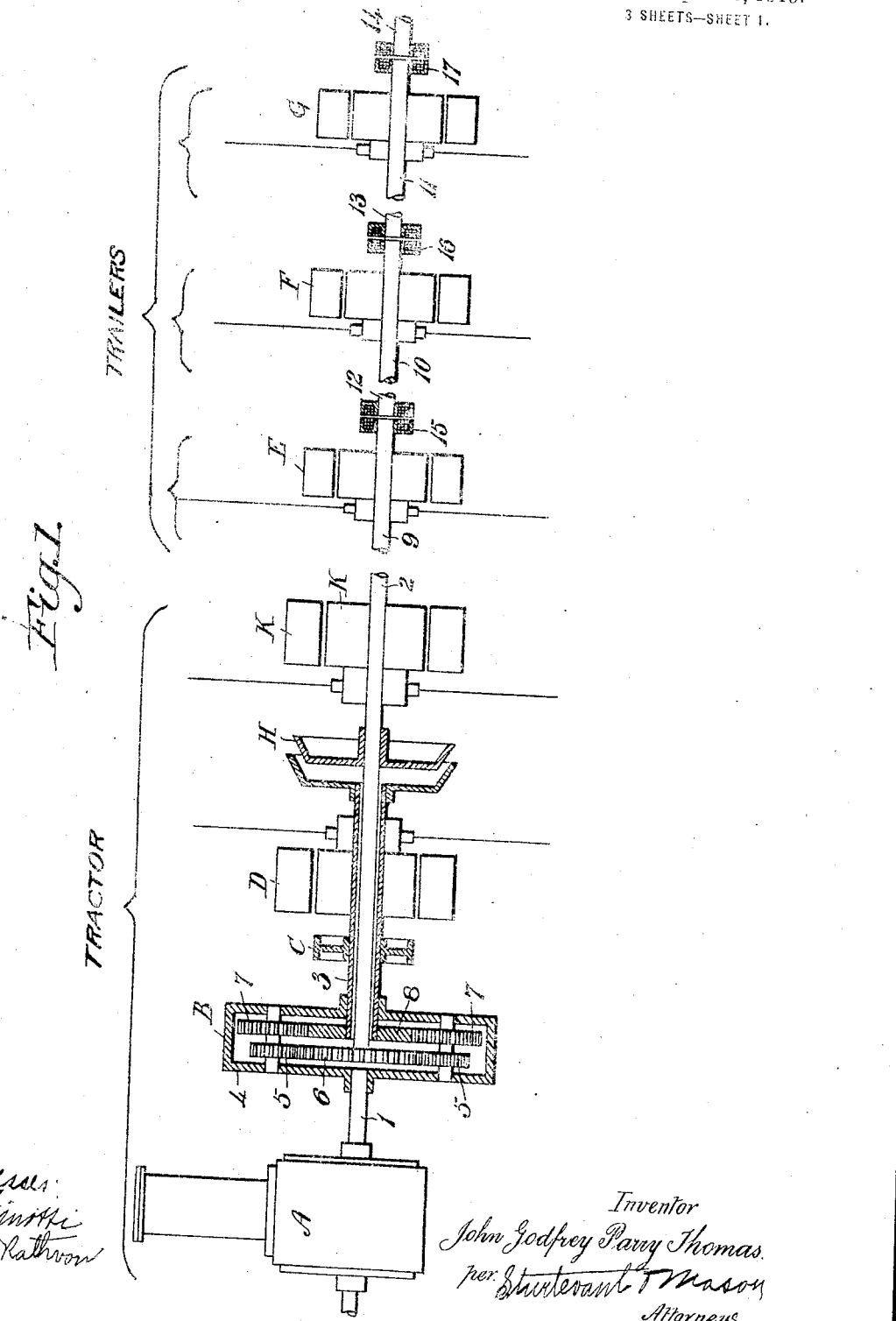

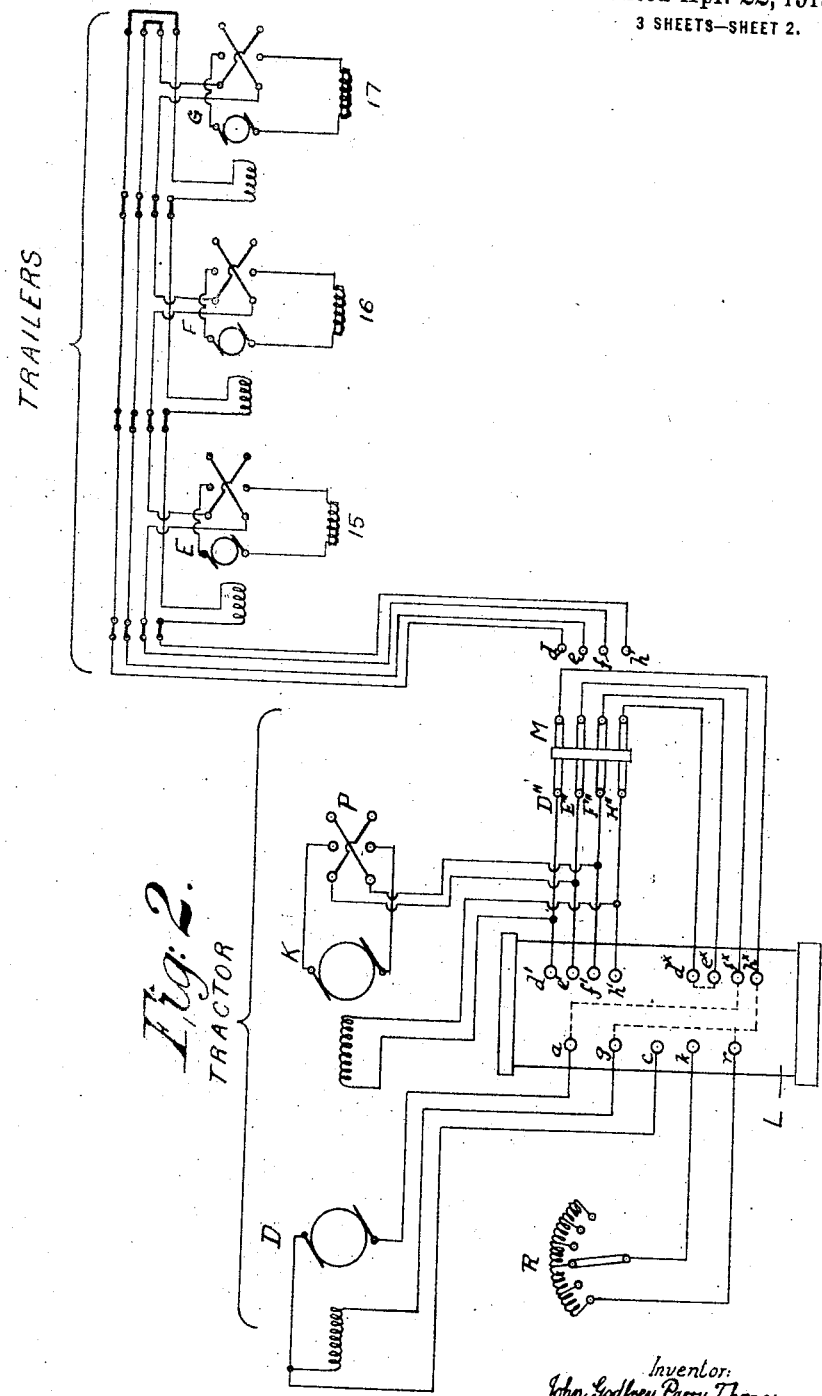

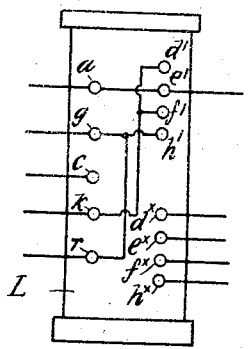
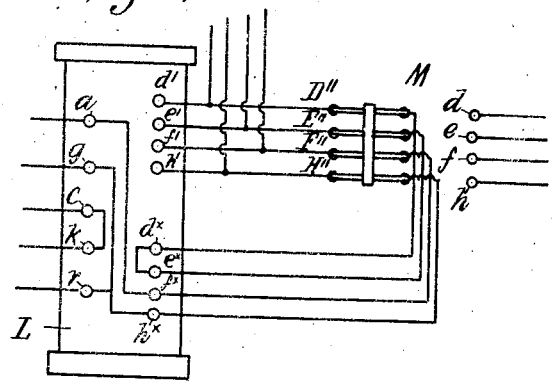
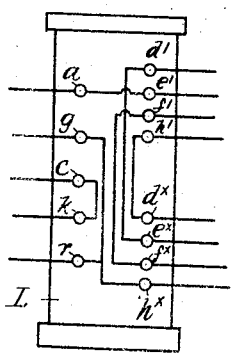
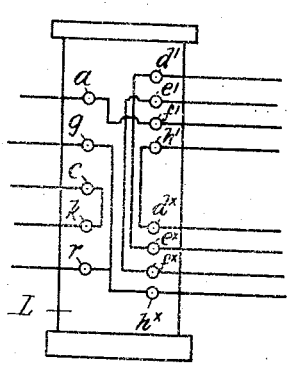

UNITED STATES PATENT OFFICE.

JOHN GODFREY PARRY THOMAS, OF KENSINGTON, LONDON, ENGLAND, ASSIGNOR TO THOMAS FOREIGN PATENTS LIMITED, OF KENSINGTON, ENGLAND.

POWER TRANSMISSION ON RAIL AND ROAD TRAINS AND THE LIKE.

1,301,763.

Specification of Letters Patent. Patented Apr. 22, 1919.

Application filed December 12, 1916. Serial No. 136,502.

*To all whom it may concern:*

Be it known that I, JOHN GODFREY PARRY THOMAS, a subject of the King of Great Britain, residing at 14 Leonard Place, High street, Kensington, in the county of London, England, have invented new and useful Improvements in Power Transmission on Rail and Road Trains and the like, of which the following is a specification.

In my prior Patent No. 948436 I have described a system of electromechanical power transmission on vehicles or trains of vehicles. In my prior Patent No. 968290 I have described an improvement on this system devised to obviate certain disadvantages arising in the application of the system to trains of vehicles.

My present invention comprises further improvements in these systems of transmission. Its object is to enable a vehicle equipped with a prime motor either to run alone or to draw a train of vehicles, power being imparted to the wheels of said vehicles or vehicle through electromechanical transmission mechanism controlled and operated substantially as set forth in my earlier specifications mentioned.

A further object of my invention is to enable variations in the distribution of the driving power as between the axles of the tractor or leading vehicle and the axles of the trailers or following vehicles in a train driven through such electromechanical transmission mechanism.

Other objects of my present invention will appear from the following description.

In the drawings:—

Figure 1 is a diagrammatic representation of the prime mover, and dynamo electric machines, and of their mechanical interconnections upon a vehicle train equipped with my invention.

Fig. 2 is a diagram of the electrical connections of the system.

Figs. 3, 4, 5, and 6 show modification of these electrical connections which can be brought about by the control apparatus.

In Fig. 1 a prime mover A drives through its shaft 1 one member 4 of a planetary or epicyclic gear 8. Member 4 carries planet pinions 5, 7, gearing respectively with sun-wheels 6, 8, upon shafts 2, 3, which also carry, respectively, the armatures of dynamo electric machines K D, both disposed upon the same vehicle as the prime motor. C indicates means for holding shaft 3 stationary, H a clutch for locking gear B solid.

These parts, together with necessary control apparatus constituted the elements of the system described in my Patent No. 948436. The means and methods of control of this system form no part of the present invention, and therefore are not illustrated except incidentally and in part in the switch P and rheostat R, of Fig. 2.

The operation of this system was as follows:—

For low speeds the field of machine D was weakly excited, and that of machine K fully excited. To increase speed excitation of D was increased and that of K weakened, until D was running quite slightly when it might be held stationary by means of C. For higher speeds the field of machine K was reversed, by such means as switch P, and machine D released and permitted to rotate as a motor in the direction reverse to its former rotation, *i. e.* in the same direction as the prime motor. Increase of the field of K then acting as a generator led to the prime motor A and machines D and K attaining a common speed, when clutch H was engaged and electrical transmission of power ceased.

My said Patent No. 948436 further contemplated a train of vehicles of which the tractor carried the parts already described except machine K, while the trailers carried each a dynamo electric machine as E F G, upon shafts 9, 10, 11, respectively, which shafts were joined mechanically to shaft 2 and to the wheels of the trailer vehicles. In this scheme the machines E F G played exactly the part played in the single vehicle arrangement by machine K.

My later Patent No. 968290 improved upon this arrangement for a train of vehicles by providing on the tractor a dynamo electric machine on the shaft of prime mover A, and by modifying the control apparatus so that machines E F G did not reverse their function and act as generators instead of motors at high speeds, but were disconnected altogether and replaced by the machine on the shaft of prime mover A.

As already stated one purpose of my present invention is to enable the tractor vehicle to operate alone, or alternatively as the leading vehicle of a train. For this purpose, in addition to the control apparatus needed to operate the system of my first patent above mentioned, which control apparatus forms no part of the present invention and is not therefore described herein, I provide further switch apparatus or control apparatus, shown in Fig. 2 as switch M separate from other control devices. The function of this switch is to replace the machines E F G by the machine K when it is desired to run the tractor alone.

When the switch M is closed upon its left-hand contacts D'', E'', F'', H'', as shown in Fig. 4, the machines E F G are disconnected and the machines D and K are operated and controlled exactly as above described, that is to say, exactly in accordance with my first Patent No. 948436. As already stated the control apparatus needed for this operation of the machines D and K forms no part of the present invention. The operations to be performed have already been mentioned and are fully set forth in my former patent. Any competent engineer can design control apparatus of any various well known forms to effect these control operations. The drawing shows such elements of control apparatus as the rheostat R and reversing switch P, and a controller L having terminals $d'$, $e'$, $f'$, $h'$, $d^x$, $e^x$, $f^x$, $h^x$, $a$, $g$, $c$, $k$, $r$. If the switch M is brought over to its right hand contacts $d$, $e$, $f$, $h$, the machines E, F, G are connected with terminals $d^x$, $e^x$, $f^x$, $h^x$, of the controller L, and replace in the control operations the machine K.

But for the reasons fully set out in my later Patent No. 968290 it is of advantage to replace the machines E F G on the trailer vehicles by the machine upon the tractor vehicle for higher speeds, that is to say, when the time comes for the machines E F G to resume their functions.

It is a further purpose of the present invention to enable the machine K upon the tractor to be utilized in this general fashion to replace the machines E F G, and this is one of the functions performed by the controller L, that is to say, when the switch M is on its right hand contacts, the controller L first connects machine D with machines E F G varying their fields in the manner already described. But when the machine D has been brought to a standstill and begins to reverse its direction of motion the controller L substitutes the machine K for the machines E F G. This it does by making connections shown in Fig. 3 in place of those shown in Fig. 2.

Besides two cases thus far dealt with namely first the case of a train of vehicles running under normal conditions, and secondly, the case of a tractor vehicle running alone, the invention contemplates and provides for two further cases which arise in practice when a train of vehicles is being operated. The tendency for the wheels of a vehicle to slip depends upon the load of the vehicle driving wheels, the condition of the road, and the power transmitted to the wheels. It may happen that in some circumstances the wheels of the tractor tend to slip. This invention provides a remedy for such a condition of affairs by enabling a larger proportion of the energy supplied from the prime mover to be conveyed to the wheels of the trailer instead of to the wheels of the tractor. This is effected by bringing the machine K into the circuit of the machines E F G in such a fashion that the machine acts at the lower speeds as a generator and assists in forwarding electrical power to the machines E F G. Consequently of the power transmitted mechanically from the prime mover to the shaft 2 only a portion is transmitted mechanically to the tractor wheels, the remaining portion being transmitted electrically to machines E F G and so to the wheels of the trailer vehicles. This function is performed by any suitable control devices, represented in the drawing by the controller L, which can produce the connections shown in Fig. 5. At higher speeds the machines E F G are cut out of circuit as before and a machine K substituted, the further operations being exactly as described in my earlier patents.

The fourth case arising when a train is being operated is that in which the wheels of the trailers and not those of the tractor tend to slip. This invention provides a remedy for such circumstances by arranging for the inclusion of the machine K in the circuits of the machines E F G in such fashion as to take a portion of the electrical power supply from the machine D. This function also is represented by the drawing as performed by the controller L which produces the connections shown in Fig. 6. At the lower speeds the machine K is then acting as a motor in the same fashion as the machines E F G. At higher speeds machines E F G are cut out and machine K reverses its function in the manner already repeatedly described.

It will be apparent that in the first, third and fourth of the different sets of circumstances above considered the machines E F G upon the trailer vehicles are operative only during low speeds and at high speeds would be rotating idly. It is a further purpose of the present invention to connect these machines with the wheels of the vehicles they drive through free wheel devices so that when the machines are not driving the wheels they are also not driven by the wheels but remain stationary thus saving frictional losses. As the train of vehicles may need to reverse its direction of motion it is desirable that there should be means of free wheeling for either direction of motion. Such free wheel devices can conveniently be brought into operation electrically, for instance from the tractor vehicle. In the drawing instead of mechanical free wheel devices magnetic clutches 15, 16, 17 are illustrated. These are actuated by the control devices on the tractor. In the example shown the windings of the clutches 15, 16, 17 are shown as joined in series with the respective machines E F G.

What I claim is:—

1. An electromechanical power transmission system for trains comprising upon the tractor a prime motor, two dynamo electric machines, gearing interconnecting said machines and motor so that their speeds are interdependent, a driving connection between one of said machines and wheels of the tractor and trailers, dynamo electric machines upon the trailers in driving connection with their wheels, controller elements upon said tractor, interconnecting the machines on said tractor and causing each in turn to operate as a motor and take power electrically from the other, and further controller elements for dis connecting the machine driving the wheels from the other machine on the tractor and for connecting in its place the machines upon the trailers.

2. A system of electromechanical power transmission on trains, comprising upon the tractor a prime motor, an electric generator, a shaft driving the tractor and trailer wheels, a gear interconnecting said prime motor, generator and shaft so that their speeds are interdependent, electric motors upon the trailers driving their wheels, a controller connecting said motors to said generator to receive power, and means connected with and governed by said controller for taking electrical power from or delivering power to the circuit of said generator and motors.

3. In an electromechanical transmission system for transmitting power upon a train of vehicles consisting of a prime mover upon one of said vehicles, a pair of dynamo electric machines on said vehicle and a plurality of driving electric motors distributed over the remainder of the vehicles of said train, gearing interconnecting said prime mover, the first of said dynamo electric machines and the second of said dynamo electric machines, and said driving motors, means for giving mechanically to the second of said dynamo electric machines power normally transmitted to the wheels of said first-named vehicle, under pre-determined conditions, and means for transmitting electrically to said second-named dynamo electric machine under other pre-determined conditions power normally transmitted to said driving motors.

4. In an electromechanical power transmission system for trains, the combination upon the tractor of a prime motor, an electric generator, a shaft driving the wheels of the tractor and trailers, an electric motor connected with said shaft, motors upon the trailers connected with their wheels, controller elements on the tractor for joining said generator to said motor on the tractor, or to said motors on the trailers, or to all of said motors on both tractor and trailers.

5. An electromechanical power transmission system for trains comprising upon the tractor a prime motor, an electric generator, a shaft driving the tractor wheels, gearing interconnecting said prime motor, generator and shaft so that their speeds are interdependent, electric motors upon the trailers driving their wheels, a second generator on the tractor driven by the shaft driving the tractor wheels, and the controller elements for interconnecting said first generator and the trailer motors so that the latter are driven electrically; and further controller elements for connecting said second generator into the circuit of said first generator and motors and for varying the power supplied by it.

6. In a motor driven train the combination of an electromechanical transmission system upon the leading vehicle of said train comprising a prime mover, a first dynamo electric element, a second dynamo electric element, all mounted on said leading vehicle and differential gearing interconnecting said two dynamo electric elements and said prime mover, a plurality of driving motors each distributed on one of the trailing vehicles of said train, and in mechanical connection with an axle of said trailing vehicle, controlling means for operating said prime mover and said first two dynamo electric elements as an electromechanical transmission system under some circumstances, switching means for substituting said driving motors for one of said dynamo electric elements under other pre-determined conditions; means for giving mechanically to the said second dynamo electric element power normally transmitted to the wheels of said leading vehicle and for transmitting said energy electrically to said driving means, and means for transmitting electrically at other times to the second dynamo electric element power normally transmitted to said driving motors, and thence transmitting said power mechanically to the wheels of said leading vehicle.

7. An electromechanical power transmission system for trains, comprising upon the tractor a prime motor, a dynamo electric machine, a second dynamo electric machine mechanically connected with the tractor wheels, a gearing interconnecting said prime motor and dynamo electric machines so that their speeds are interdependent, electric motors on the trailers driving their wheels, controller elements connecting said first dynamo electric machine to said motors, and further controller elements for connecting said second dynamo electric machine into the circuit of said first machine and motors for causing it to operate alternatively as a generator and motor.

In testimony whereof I sign my name to this specification in the presence of two subscribing witnesses.

JOHN GODFREY PARRY THOMAS.

Witnesses:
GEORGE HUGHES,
EDWARD C. FRYES.

Copies of this patent may be obtained for five cents each, by addressing the "Commissioner of Patents, Washington, D. C."